United States Patent [19]
Hayashi et al.

[11] Patent Number: 5,172,243
[45] Date of Patent: Dec. 15, 1992

[54] DATA TRANSMITTER-RECEIVER APPARATUS FOR TRANSMITTING AND RECEIVING IMAGE DATA

[75] Inventors: Motohiko Hayashi; Matahira Kotani, both of Nara; Hiroya Inagaki, Tokyo; Naomitsu Murata, Aichi, all of Japan

[73] Assignee: Sharp Kabushiki Kaisha, Osaka, Japan

[21] Appl. No.: 404,505

[22] Filed: Sep. 8, 1989

[30] Foreign Application Priority Data

Sep. 13, 1988 [JP] Japan .................. 63-229666

[51] Int. Cl.⁵ ................... H04N 1/00; H04N 1/024; H04N 1/04
[52] U.S. Cl. .................. 358/400; 358/473; 358/476; 379/100
[58] Field of Search ........... 358/473, 497, 434, 400, 358/401, 443, 471, 476, 494; 382/59; 379/100

[56] References Cited

U.S. PATENT DOCUMENTS

| | | | |
|---|---|---|---|
| 4,639,790 | 1/1987 | Kusaka | 358/497 |
| 4,652,937 | 3/1987 | Shimura et al. | 358/473 |
| 4,707,747 | 11/1987 | Rockwell, III | 358/473 |
| 4,837,812 | 6/1989 | Takahashi et al. | 358/434 |
| 4,962,526 | 10/1990 | Kotani et al. | 358/476 |

FOREIGN PATENT DOCUMENTS

| | | |
|---|---|---|
| 3220016A1 | 12/1983 | Fed. Rep. of Germany. |
| 63-30461 | 2/1987 | Japan. |
| 62-30461 | 9/1987 | Japan. |

*Primary Examiner*—Edward L. Coles, Sr.
*Assistant Examiner*—Thomas D. Lee

[57] ABSTRACT

The present disclosed invention includes a telephone set provided with a facsimile function. The telephone set includes an image reader which can be mounted on and detached from its body. The reader can be detached and operated to scan an original with an image to be transmitted thereon. A read-out image data signal is modulated in frequency and then transmitted toward a receiving portion in the body through a transmitting portion in the reader. The received image data are transmitted to another desired facsimile terminal equipment through a telephone line. Since there is no need for an electric wire to be connected between the body and the reader, a more flexible reading of an image can be achieved.

13 Claims, 3 Drawing Sheets

DATA TRANSMITTER-RECEIVER APPARATUS FOR TRANSMITTING AND RECEIVING IMAGE DATA

BACKGROUND OF THE INVENTION

1. Field of the Invention

The present invention generally relates to data transmitter-receiver apparatuses, and more particularly, to a wireless data transmitter-receiver apparatus for transmitting and receiving image data. The present invention has particular applicability to a telephone set provided with the function of a facsimile.

2. Description of the Background Art

In a conventional facsimile terminal equipment, a paper having an image to be transmitted thereon, or an original, is initially inserted in an original insert inlet so that image data will be read out. The read-out image data are transmitted toward another desired facsimile terminal equipment through a transmitter incorporated in the former facsimile terminal equipment. A one-dimensional contact-type image sensor is provided in the vicinity of the original insert inlet inside the apparatus as a reader for the image data. The width of the inlet for inserting an original, therefore, is limited according to the length of the image sensor.

It has been pointed out that such a facsimile terminal equipment does not permit transmission of an image on a paper which cannot be inserted into the original insert inlet. For example, images on papers the sizes of which are not comparable to the original insert inlet or papers in bound form, such as a book, can not be read out nor transmitted by the facsimile terminal equipment.

In the Japanese Patent Laying-Open Gazette No. 62-30461, the prior art available for solving the aforementioned problem is disclosed. In this gazette, there is described an image reading apparatus comprising a reader which can be detached from the body of the apparatus for manual operation. Image data which have been read out through the manual operation of the reader are transmitted by one facsimile terminal equipment toward another as desired. Since the reader is detachable from the body of the apparatus, reading and transmission of the image data can be accomplished regardless of the size of a paper which has an image to be transmitted thereon.

However, in the aforementioned image reading apparatus, a cord or electric wire is required to connect between the reader and the body of the apparatus. Through this cord, power is supplied to the reader and the image data read out by the reader are transmitted to the apparatus body. Therefore, the cord is always connected to the reader so that scanning by the reader along a scanning path is disturbed by the cord and an area in which the reader can be operated is limited according to the length of the cord. This means that reading of the image data is allowed only in the vicinity of the apparatus body.

SUMMARY OF THE INVENTION

One object of the present invention is to prevent any limitations regarding the acceptability of an image and an image transmitter-receiver apparatus depending on the size of a paper on which the image to be transmitted has been illustrated.

Another object of the present invention is to permit a more flexible entry of image data in an image transmitter-receiver apparatus.

Still another object of the present invention is to separate an image transmitter, comprising an image reader, from an image receiver in an image transmitter-receiver apparatus.

Still another object of the present invention is to eliminate obstacles in a scanning path along which an image reader is manually operated.

Yet another object of the present invention is to expand an area in which an image reader of an image transmitter-receiver apparatus can be used.

Briefly stated, an image transmitter-receiver apparatus according to the present invention comprises a data transmitter for transmitting image data and a data receiver for receiving an image data signal transmitted from the data transmitter. The data transmitter and the data receiver are both operative whether they are separated or connected together. The data transmitter comprises a data input circuit for entering image data to be transmitted, a modulation circuit for modulating the entered image data for transmission according to a predetermined modulation scheme, and a wireless transmitting circuit for transmitting the modulated image data signal wireless. The data receiver comprises a receiving circuit for receiving the image signal transmitted from the wireless transmitting circuit, a demodulation circuit for demodulating the received image signal according to the modulation scheme, and a data output circuit responsive to the demodulated image signal for outputting the image data.

In operation, the data transmitter can be used in a separated state from the data receiver. The image data entered in the data input circuit is modulated in the modulation circuit and then transmitted from the wireless transmitting circuit toward the data receiver wireless. Since the transmission of the image data is performed wireless, no electric wire is required as a connection between the data transmitter and the data receiver. Therefore, the image data can be more flexibly entered in this image transmitter-receiver apparatus.

In a preferred embodiment of the present invention, such an image transmitter-receiver apparatus as described above is applied to a facsimile terminal equipment. Additionally, the data receiver comprises a circuit for transmitting the image data outputted from the data output circuit through a communications line.

The foregoing and other objects, features, aspects and advantages of the present invention will become more apparent from the following detailed description of the present invention given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
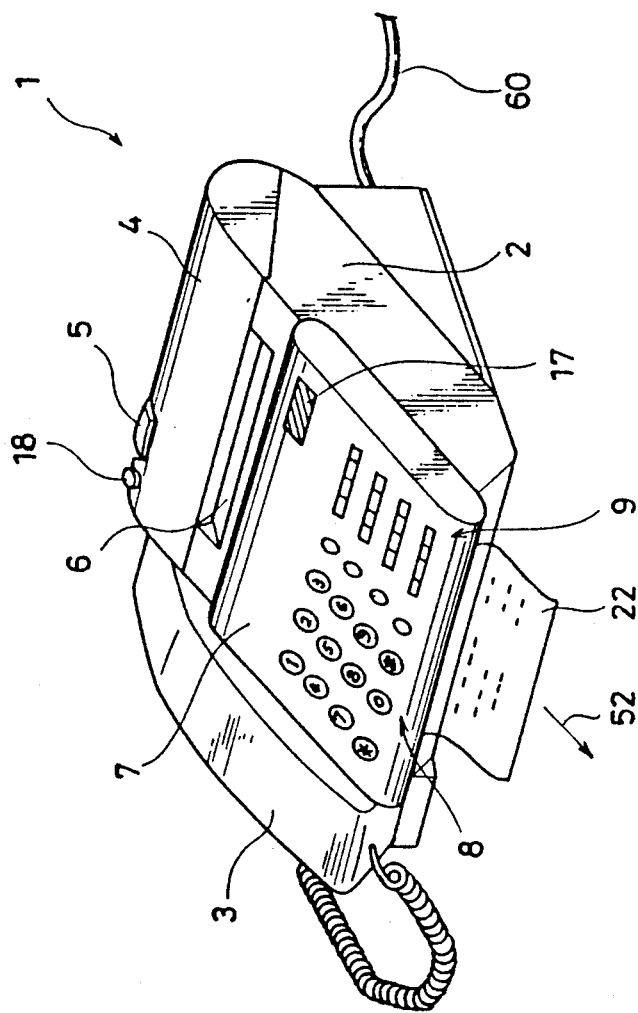
FIG. 1 is a perspective view of a telephone set provided with a facsimile function, according to an embodiment of the present invention.

Referring to FIG. 1, there is shown a telephone set 1 provided with a facsimile function. This telephone set comprises a body 2, a handset 3, and a reader 4 for reading image data. The reader 4 can be mounted on and also detached from the body 2, and can read out image data whether it is mounted or not. A starting switch 5 for instructing the start reading operation and a transmitting portion 18 for transmitting the read-out image data are provided on the reader 4. A image data signal transmitted from the transmitting portion 18 is modulated by a FM modulation circuit incorporated in the reader 4. When the reader 4 is mounted on the body 2, an inlet 6 is formed between these two devices to accept a paper on which an image to be transmitted by the facsimile function has been illustrated.

An operation panel 7 is provided on the body 2 to face a user. On the operation panel 7, a registering key 8 for entering dial numbers, a function key 9 for designating various functions and a receiving portion 17 for receiving the image data transmitted from the reader 4 are provided.

Figure 2:
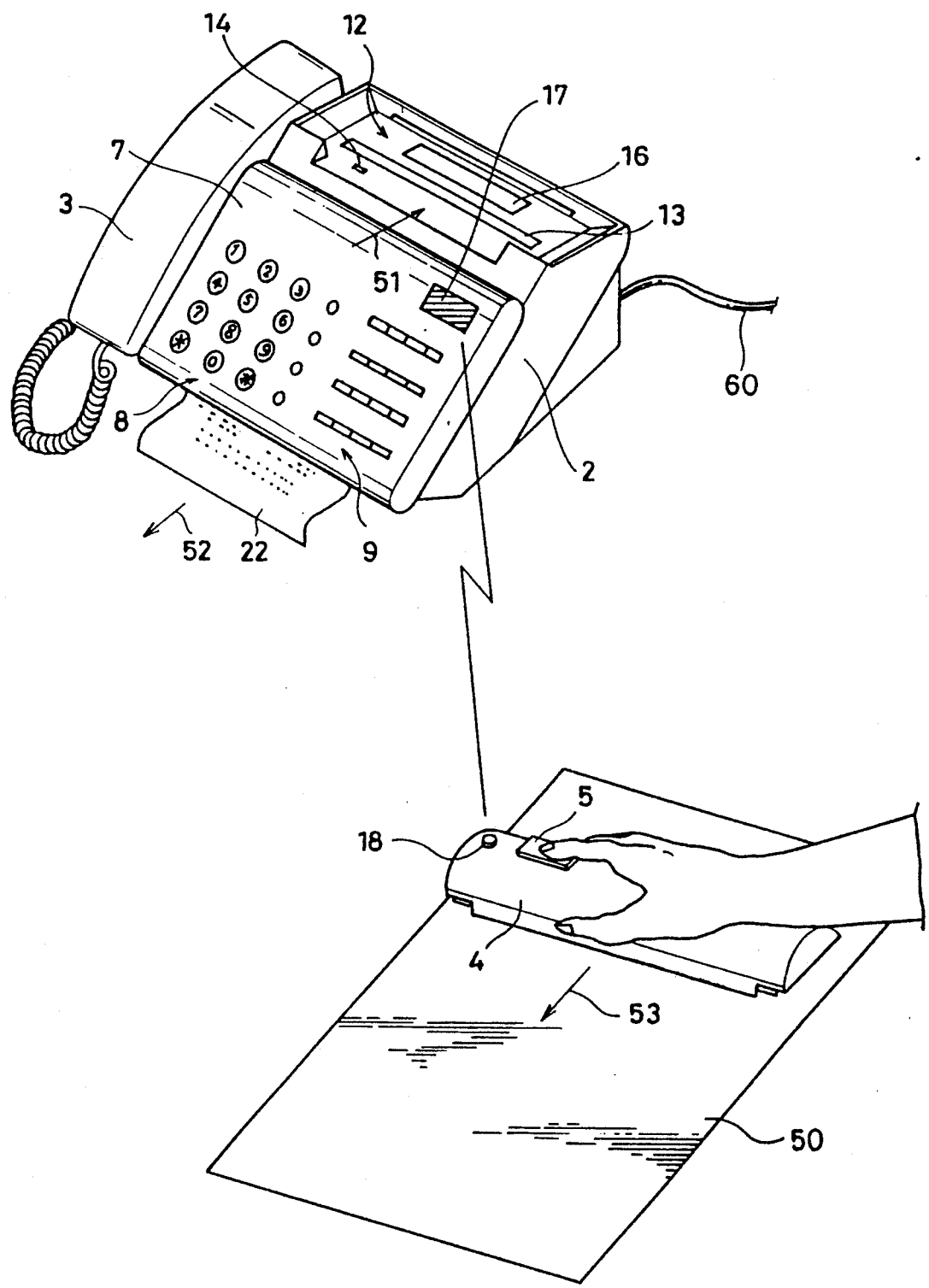
FIG. 2 is an illustrated presentation for explaining the main operation of the telephone set shown in FIG. 1.

Referring to FIG. 2, there is described a situation where the reader 4 detached from the body 2 is manually operated to read out an image on an original 50. On the upper portion of the body 2, with the reader 4 detached therefrom, there can be seen a mount portion 12 for the reader 4, a feed roller 13 for feeding an original when the reader 4 is mounted on the mount portion 12, and an original detection sensor 14 for detecting insertion of an original. When the reader 4 is mounted on the body 2, an original is inserted in the inlet along the arrow 51 so as to be read out by the apparatus. Additionally, a sheet 16 is provided on the mount portion 12 to reduce friction which is caused by inserting an original to face the feed roller 13.

Now, the main operation of a facsimile function comprised in the telephone set 1 shown in FIG. 1 will be described below. When the apparatus having the reader 4 mounted on its body 2, as shown in FIG. 1, receives image data from another facsimile terminal equipment through a telephone line 60, a thermal recording paper 22 on which the received image has been described will be outputted from the lower portion of the operation panel 7 along the arrow 52.

Meanwhile, when image data to be transmitted should be entered in the apparatus having the reader 4 mounted on its body 2, an original with an image thereon is inserted in the inlet 6. Therefore, the size of the original will be limited depending on the size of the inlet 6. After the image data have been read out, the image data will be transmitted toward another desired facsimile terminal equipment through the telephone line 60.

In such a case where the size of an original with an image to be transmitted thereon is larger than the size of the inlet 6, or an original is at a distance from the body 2, the reader 4 is detached from the body 2, as shown in FIG. 2 so as to read out the image data. In the reader 4, a one-dimensional contact-type image sensor and a roller having an encoder incorporated therein (neither of them are shown) are provided. Additionally, the reader 4 comprises a detection sensor (not shown) for detecting whether the reader 4 is mounted on the body 2 or not.

The reading operation of the image data by the detached reader 4 is as follows. Initially, the reader 4 is put on an original 50 which includes an image to be transmitted thereon, while held by a hand. A switch 5 for instructing the start of reading of the image will then be depressed so that the reader 4 begins to move along the arrow 53 by means of rotation of the roller. In such a manner, the image on the original 50 is read out by the image sensor and encoded by the encoder incorporated in the roller. The encoded image data will then be transmitted toward the receiving portion 17 of the telephone set 1 through the transmitting portion 18 in the reader 4.

The telephone set 1 receives the image data from the reader 4 through its receiving portion 17. The telephone set 1 is able to output a thermal recording paper 22 on which an image has been recorded based on the received image data, or to transmit the image data toward another facsimile terminal equipment to which the image is to be transmitted, through the telephone line 60.

Figure 3:
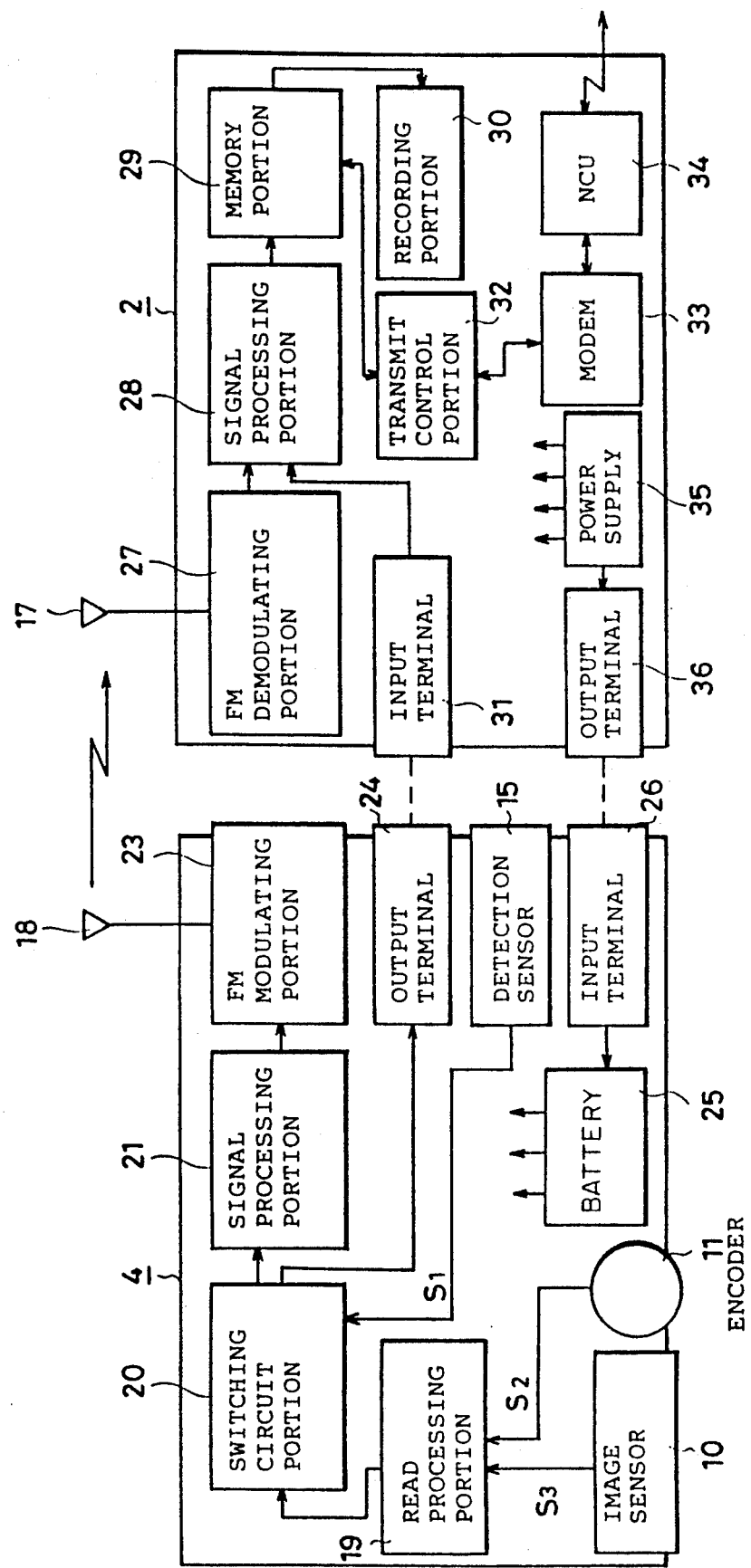
FIG. 3 is a block diagram showing a circuit structure of the telephone set shown in FIG. 1.

Referring to FIG. 3, there is shown a block diagram of circuits incorporated in the body 2 and the reader 4 to process the image data. The same reference numerals designating each portion of the telephone set in FIGS. 1 and 2 are used to indicate the corresponding parts in the circuits.

The reader comprises an encoder 11 for detecting the scanning speed of manual operation, an image sensor 10 for detecting an image, a read processing portion responsive to an output signal from the encoder 11 for processing image signal outputted from the image sensor 10, a switching circuit portion 20 for selectively outputting image data outputted from the read processing portion 19, a signal processing portion 21 for processing signals so as to transmit image data, an FM modulation portion for FM-modulating an output signal from the signal processing portion 21, a transmitting portion 18 for transmitting the modulated signal, and an output terminal 24 for outputting the image data directly to the body 2. Additionally, this reader 4 is provided with a sensor 15 for detecting the mounted state of the reader 4 on the body 2, a battery 25 as a power supply for the reader 4, and an input terminal 26 through which power is supplied to the battery 25.

The body 2 comprises a demodulating portion 27 for FM-demodulating signals received through the receiving portion 17, a signal processing portion 28 for processing the image data outputted from the demodulating portion 27, a memory portion 29 for temporarily storing the image data, and a recording portion 30 for recording an image on a thermal recording paper based on the image data stored in the memory portion 29. The body 2 further comprises an input terminal 31 for accepting the image data through the output terminal 24 of the reader 4. The signal processing portion 28 also processes the image data entered through the input terminal 31. Additionally, the body 2 comprises a transmit control portion 32, a modem 33 and a network control unit (referred to as NCU hereinafter) 34, all for transmitting the image data stored in the memory portion 29 through the telephone line.

Description will be now made on the operation of the circuits shown in FIG. 3, with respect to each of the cases where the reader 4 is detached from or mounted on the body 2 for use.

First, an image data reading and transmitting operation will be described in the case where the reader 4 is detached from the body 2. The sensor 15 detects the reader 4 being detached from the body 2 and applier a detecting signal S1 to the switching circuit portion 20. The switching circuit portion 20 is responsive to the signal S1 to apply for applying the image data outputted from the read processing portion 19 to the signal processing portion 21. As shown in FIG. 2, when the reader 4 is operated manually to scan on the original 50, the encoder 11 applies a pulse signal S2 to the read processing portion 19 in response to the scanning speed. At the same time, the image sensor 10 reads out an image on the original 50 to apply an image signal S3 to the read processing portion 19. The read processing portion 19 is responsive to the pulse signal S2 for converting the image signal from the image sensor 10 into single-line image data. The image data outputted from the read processing portion 19 is applied to the signal processing portion 21 through the switching circuit portion 20. The signal processing portion 21 is synchronized with the FM-modulating portion 23 to apply the received image data thereto. The image data outputted from the signal processing portion 21 are FM-modulated by the FM-modulating portion 23 and then transmitted toward the receiving portion 17 in the body through the transmitting portion 18.

The image data signal received by the receiving portion 17 or a receiving antenna of the body 2 is demodulated by the FM-demodulating portion 27 and then applied to the signal processing portion 28. The image data processed by the signal processing portion 28 are applied to the memory portion 29 to be stored therein temporarily. When it is required that an image is outputted based on the image data stored in the memory portion 29, it will be printed on a thermal recording paper by means of the recording portion 30. On the other hand, when the image is required to be transmitted to another facsimile terminal equipment through the telephone line, the image data signal stored in the memory portion 29 will be outputted on the telephone line through the transmit control portion 32, the modem 33 and the NCU 34.

In the case where the reader 4 is detached from the body 2, the battery 25 comprised in the reader 4 supplies power to each circuit portion therein, while each circuit portion in the body 2 is powered by the power supply 35.

Secondly, an image reading and transmitting operation in the case where the reader 4 is mounted on the body 2 will be described. In this case, the sensor 15 detects the reader 4 in its mounted position on the body 2 and applies a detecting signal S1 to the switching circuit portion 20. The switching circuit portion 20 then applies the image data from the read processing portion 19 to the output terminal 24. Therefore, single-line image data obtained in the same manner as in the aforementioned case will be applied to the output terminal 24 through the switching circuit portion 20. When the reader 4 is mounted on the body 2, the output terminal 24 and the input terminal 26 of the reader 4 are integrally connected with the input terminal 31 and the output terminal 36 of the body 2, respectively. Therefore, the image data from the switching circuit portion 20 are directly applied to the input terminal 31 in the body 2 through the output terminal 24 of the reader 4. The signal processing portion 28 processes the image data applied to the input terminal 31 from the reader 4 in the same manner as described previously. Since the image data outputted from the signal processing portion 28 are further processed in the same manner as in the case where the reader 4 is detached from the body 2, the description thereof will not be repeated here.

As has been described, since the input terminal 26 and the output terminal 36 are integrally connected in this case, the reader 4 can be powered by the power supply 35 incorporated in the body 2. The power supply 35 delivers the supply voltage to the battery 25 and each circuit portion in the reader 4. Therefore, power consumption of the battery 25 can be prevented while the reader 4 is mounted on the body 2. When the reader 4 does not perform a reading operation, the battery 25 is automatically charged by the delivered voltage so that each circuit portion in the reader 4 is fully powered by the battery 25 only if only the reader 4 is not used for too long a time while detached from the body 2.

As described in the foregoing, in a transmitter-receiver apparatus according to the present invention, the reader 4 can read out an original 50 without being connected to the body 2 by a cord or electric wire, as shown in FIG. 2, so that a more flexible entry of image data into the apparatus can be achieved. In other words, obstacles such as an electric wire connected to the reader 4 can be eliminated from the scanning path of the reader 4. It is to be also pointed out that the reader 4 shown in FIG. 2 is wireless one so that the usable area which of the reader 4 will be expanded. With the use of the wireless image reader 4, the acceptability of an image in the apparatus is not defined by the size of the original on which the image to be transmitted has been illustrated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising a data transmitter for transmitting image data and a data receiver for receiving an image data signal transmitted from the data transmitter, wherein the data transmitter and the data receiver are operative both separated from and connected to each other, the data transmitter comprising data input means for sensing and generating image data of a desired image;

modulating means, for modulating the image data for transmission according to a predetermined modulation scheme;

wireless transmitting means, coupled to said modulating means, for transmitting the modulated image data wirelessly;

first detecting means for detecting when the data transmitter and the data receiver are connected to each other and for generating amounting signal indicative thereof;

a first output terminal for outputting the image data; and switching means, coupled to said data input means and responsive to said first detecting means, for applying the image data to said first output terminal upon receipt of the mounting signal and to said modulating means otherwise, the data receiver comprising receiving means for receiving the transmitted image signal from said wireless transmitting means and for outputting a received image signal;

demodulating means, coupled to said receiving means, for demodulating the received image signal according to the predetermined modulation scheme;

data output means, coupled to said demodulating means and responsive to the demodulated image signal, for outputting image data; and a first input terminal for receiving the image data directly from said first output terminal and for supplying the directly received image data to said data output means, said first output terminal and said first input terminal being integrally coupled together when the data transmitter and the data receiver are connected to each other.

2. The facsimile apparatus according to claim 1, said data input means comprising reading a means for reading image by manually operating said data input means to scan an original having the image to be transmitted thereon.

3. The facsimile apparatus according to claim 2, said reading means comprising:

image sensor means for reading the image through the scanning operation of said data input means;

second detecting means for detecting scanning speed of said data input means; and converting means coupled to said image sensor means and responsive to said second detecting means for converting the read-out image into single-line image data.

4. The facsimile apparatus according to claim 1, said predetermined modulation scheme comprises frequency modulation.

5. The facsimile apparatus according to claim 1, the data transmitter further comprising battery means for supplying power to the data transmitter; and a second input terminal, coupled to said battery means, for receiving charging voltage to charge said battery means, the data receiver further comprising power supply means for supplying power to the data transmitter and the data receiver; and a second output terminal coupled to said power supply means, said second input terminal and said second output terminal being operatively coupled together the data transmitter and the data receiver are connected to each other.

6. The facsimile apparatus according to claim 1, the data receiver further comprising means for transmitting the image data outputted from said data output means through a communications line.

7. The facsimile apparatus according to claim 1, the data receiver further comprising image recording means coupled to said data output means and responsive to the outputted image data, for outputting an image on a recording medium for recording.

8. A data transmitter of a facsimile unit, for transmitting image data to a receiver of a facsimile unit, the data transmitter and the receiver being operatively communicable both when coupled together and detached from one another, comprising:

data input means for entering image data to be transmitted therethrough to switching means;

detection means for determining if the data transmitter and the receiver are operatively coupled together and for generating a coupled signal indicative thereof;

modulating means, coupled to said switching means, for modulating the image data for transmission according to a predetermined modulation scheme;

wireless transmitting means, coupled to said modulating means, for wirelessly transmitting the modulated image data to the receiver when the data transmitter and the receiver are detached from one another; and output terminal means, coupled to said switching means, for directly supplying the image data to an input terminal of the receiver when the data transmitter and the receiver are operatively coupled together, said switching means being coupled to the detection means and supplying the image data to said modulating means upon receipt of the coupled signal and to said output terminal means in absence of receipt of the coupled signal.

9. A data receiver of a facsimile unit, for receiving image data based on an image data signal transmitted by a transmitter of the facsimile unit, the data transmitter and the receiver being operatively communicable both when coupled together and detached from one another, comprising:

receiving means for receiving an image signal, modulated according to a predetermined modulation scheme and transmitted wirelessly from the transmitter of the facsimile unit, when the data receiver and the transmitter are detached from one another;

demodulating means, coupled to said receiving means, for demodulating the received image signal according to said predetermined modulation scheme;

input terminal means for directly receiving an image signal from output terminal means of the transmitter when the data receiver and the transmitter are operatively coupled together; and data output means, connected to said demodulating means and said input terminal means, for outputting image data based upon the directly received image signal form said input terminal means and the demodulated image signal from said demodulating means, the transmitter comprising sensing means for determining whether or not the data receiver and the transmitter are operatively coupled together to direct transmission of the image signal wirelessly or in the alternative, through said input and output terminal means.

10. A facsimile apparatus comprising:

image sensor means for generating image signals of an image;

switch means, coupled to said image sensor means, for receiving the image signals and for outputting the image signals via a first output or a second output in accordance with a mounted signal;

wireless transmitting means, coupled to said switch means via said first output, for modulating and transmitting the image signals;

an output terminal, coupled to said switch means via said second input, for directly outputting the image signals;

base facsimile means, for generating facsimile signals in accordance with the transmitted image signals from said wireless transmitting means and the directly outputted image signals from the output terminal, the transmitted image signals being received via wireless receiving means and the directly outputted signals via an input terminal, said image sensor means, said switch means, said wireless transmitting means and said output terminal being housed within a portable imaging unit operable both mounted to and detached from said base facsimile means; and mounting sensing means, housed upon said portable imaging unit and coupled to said switch means, for generating the mounted signal when the portable imaging unit is mounted to said base facsimile means to direct said switch means to output the image signals via said second output only, the image signals being outputted form said first output in absence of receipt of the mounted signal.

11. The facsimile apparatus of claim 10, wherein said portable imaging unit further comprises:

a power terminal, connectable to a power supply terminal of said base facsimile means when said portable imaging unit is mounted thereto, from receiving operating power from power supply means of said base facsimile means; and battery means for powering said portable imaging unit when said portable imaging unit is detached from said base facsimile means.

12. The facsimile apparatus of claim 10, wherein said portable imaging unit further comprises:

processing means, coupled to said image sensor means, for processing and outputting the image signals to said switch means on a line by line basis; and scanning speed detecting means, coupled to said processing means, for generating and supplying to said processing means scan speed signals indicative of a speed of manual manipulation of said portable imaging unit over an image by a user.

13. The facsimile apparatus of claim 10, wherein said wireless transmitting means frequency modulates the image signal prior to transmission thereof.

* * * * *

UNITED STATES PATENT AND TRADEMARK OFFICE
CERTIFICATE OF CORRECTION

PATENT NO. :   5,172,243
DATED      :   December 15, 1992
INVENTOR(S) :  M. HAYASHI et al It is certified that error appears in the above-indentified patent and that said Letters Patent is hereby corrected as shown below:

On the Title Page, Item [73]:

Should read:   Sharp Kabushiki Kaisha and Nippon Telegraph & Telephone Corporation, Osaka, Japan--

Signed and Sealed this

Nineteenth Day of April, 1994

Attest:

BRUCE LEHMAN

*Attesting Officer*     *Commissioner of Patents and Trademarks*